United States Patent [19]

Zellerhoff et al.

[11] 4,429,172
[45] Jan. 31, 1984

[54] PROCESS FOR THE PRODUCTION OF MODIFIED PITCHES AND LOW BOILING AROMATICS AND OLEFINS AND USE OF SAID PITCHES

[75] Inventors: Robert Zellerhoff, Dinslaken; Maximilian Zander; Franz Kajetanczyk, both of Castrop-Rauxel, all of Fed. Rep. of Germany

[73] Assignee: Rütgerswerke Aktiengesellschaft, Frankfurt am Main, Fed. Rep. of Germany

[21] Appl. No.: 305,001

[22] Filed: Sep. 23, 1981

[30] Foreign Application Priority Data

Oct. 7, 1980 [DE] Fed. Rep. of Germany ....... 3037829

[51] Int. Cl.$^3$ .......................... C07C 1/00; C07C 4/00; C10B 57/04
[52] U.S. Cl. .................................... 585/241; 201/2.5; 201/21; 252/511; 524/577; 524/580; 208/22; 208/39
[58] Field of Search ................... 585/241; 201/2.5, 21; 252/511; 524/577, 580

[56] References Cited

U.S. PATENT DOCUMENTS

| | | | |
|---|---|---|---|
| 2,455,890 | 12/1948 | Fawcett | 524/577 |
| 3,829,558 | 8/1974 | Banks et al. | 585/241 |
| 3,843,339 | 10/1974 | Saito | 201/2.5 |
| 3,901,951 | 8/1975 | Nishizaki | 585/241 |
| 4,108,730 | 8/1978 | Chen et al. | 201/2.5 |
| 4,175,211 | 11/1979 | Chen et al. | 585/241 |
| 4,361,506 | 11/1982 | Russo | 524/577 |

FOREIGN PATENT DOCUMENTS

55-149683 11/1980 Japan ..................................... 252/511
490814 8/1938 United Kingdom ................ 524/577

OTHER PUBLICATIONS

*Make Fuel from Plastic Wastes,* Hydrocarbon Process, vol. 51, Oct. 1972, pp. 161-163.
*Pyrolipis of Waste Plastics,* Chem. Abs., vol. 80, (99897j), p. 260, 1974, Sakai Tadamoto.
*Pyrolipis Oils from Thermal Cracking of Thermoplastic Polymeric Materials,* Chem. Abs., vol. 85:82996m, 1976, Nozaki, Yasuo et al., 1976, p. 325, Japan.
*Study on Prep. of Active Carbon from Wastes Plastics,* Chem. Abst., vol. 91:195229r; p. 117, N. Kasaoka.
*Pyrolysis of Polyolefin Plastics;* vol. 95:65247s, 1981, p. 186; Agency of Ind. Sciences and Tech., Japan.
*Recovering Useful Components from Synthetic Polymeric Scraps;* Chem. Abs., vol. 80:19255k, p. 302, S. Kurisu, 1974.
*Stagewise Thermal Decomp. of Mixed Plastic Scraps,* vol. 80:124443t, 1974, p. 239; Yuta Ku Aradida, Japan.

*Primary Examiner*—Delbert E. Gantz
*Assistant Examiner*—Helane E. Maull
*Attorney, Agent, or Firm*—Beveridge, DeGrandi & Kline

[57] ABSTRACT

A process for the preparation of modified pitches and low boiling aromatics and olefins is described. Waste plastic which consists of polymeric chains of olefins is subjected to a thermal treatment in the presence of high boiling aromatics. The modified pitches may be used for the production of carbon articles of high value.

4 Claims, No Drawings

PROCESS FOR THE PRODUCTION OF MODIFIED PITCHES AND LOW BOILING AROMATICS AND OLEFINS AND USE OF SAID PITCHES

The invention relates to a process for the production of modified pitches and low boiling aromatics and olefins by thermal treatment of plastic wastes which consist of polymeric chains of olefins in the presence of high boiling aromatic mixtures. Furthermore, uses are described, according to the invention, of the modified pitches for the production of high value carbon bodies.

Because of the long term increasing shortage of crude oil and natural gas, a worldwide search is on for new energy carriers, power fuels and chemical raw materials. In this situation, in addition to hydrocarbons obtained from coals, wastes containing hydrocarbons also become of increasing importance as raw materials. Of particular interest are the wastes of the plastics producing and processing industry. Basically, three ways are known for the reuse of these wastes:

1. The reuse through plastic processing without change of the characteristics of the product.
2. The recapture of the starting raw materials by pyrolysis.
3. The modification of other substances by the addition of these wastes.

The processing according to the invention is a combination of the two last mentioned ways.

In this respect, it is known from Japanese Pat. No. 7405183 to dissolve 37.5 parts by weight of polystyrene wastes in 62.5 parts by weight of solvent and to distill them by decomposition up to 600° C. A part of the distillate obtained is used as a solvent. The yield of styrene amounts to almost 82%.

From German OS No. 29 45 365, the addition of styrene copolymers to bitumen is known. In this case, 2-20% of polymers are mixed at 130° to 230° C. with bitumen. The modified bitumen shows improved plasticity characteristics for road building.

Furthermore, from German OS No. 21 24 636, the production of carbon fibers from bituminous coal tar pitch is known to which about 10% of polymers, such as for example polystyrene are added. The mixture is heated to 420° C. in order to distill off the more easily volatile components. The distillation temperature must not be decreased considerably, since the low boiling substances make the oxidation processing for making the fiber unmeltable, more difficult. The carbon fiber produced from the distillation residue shows improved characteristics as compared to the one made from bituminous coal tar pitch. Therefore, according to the state of the prior art, it is possible to feed wastes which consist of polymeric chains of olefins in the most diverse manner to a reuse. The known processes however are unsatisfactory, since these valuable raw materials or the substances obtained from them, must at least partially be accommodated in products with comparatively low value.

Therefore, the problem existed of converting wastes of polyolefins in a careful manner into higher value modified pitches and low boiling aromatics and olefins.

According to the invention, this problem is solved through the fact that 10–80 parts by weight of comminuted wastes of polyolefins are treated thermally at temperatures above their decomposition point and pressures between 1 and 30 bar with 20–90 parts by weight of an aromatic hydrocarbon mixture boiling above 300° C. under an atmosphere of inert gas, whereby olefins, benzene homologues as well as a reaction pitch are obtained optionally after distillation. Since the ratio of the yield of olefins to the yield of benzene homologues depends on the pressure, the process may be adapted in an advantageous manner to economic conditions. The mixture consisting of olefins and benzene homologues may be further processed in any known manner.

As compared to the aromatic hydrocarbon mixtures used, the reaction pitch has a surprisingly high softening point. This is to be explained by the dehydrating effect of the polyolefins fragments on the high boiling aromatics while forming benzene homologues. In this manner, new highly condensed aromatics develop. An increase of the pressure leads to a greater yield of pitch with lower softening point, since, as a result of it, obviously more polyolefin fragments participate in the formation of pitch. The characteristics of the reaction pitch may be varied within wide limits and through variable portions of polyolefin wastes in the product to be used.

The use of polystyrene wastes, such as for example wastes from the processing of foamed polystyrene has turned out to be particularly advantageous, since the reaction products are aromatic. The reaction pitch is eminently suited for the production of electrode binding and impregnating pitches with a high portion of β-resin [by β-resins, it is intended to indicate the difference of toluene-insoluble (TI) and quinolene-insoluble (QI)] as well as for the production of highly anisotropic, low temperature cokes, for example, for electrographite.

Other polyolefin wastes, for example, from polyethylene, will lead to pitches with a low portion of β-resins, but a highly carbonization residue, as desirable for the production of impregnating pitches and in the case of the pressureless pitch coking, for example, in byproduct coke ovens.

The aromatic hydrocarbon substance mixtures boiling above 300° C. and used according to the invention are obtained preferably in the case of reprocessing of hydrocarbons, as for example, in the case of distillation of bituminous coal tar. But they may just as well be obtained in the case of reprocessing of highly aromatic residual oils obtained in the case of the thermal or catalytic cracking of petroleum oil fractions. Also included in this are reprocessing residues such as, for example, bituminous coal-tar standard pitch.

The use of standard pitch according to the process of the invention leads to a remarkable increase in yield, as compared to the traditional processes for the electrode pitch production.

As a result of the possibility of producing pitches at a high yield also from high boiling aromatic oils, such as for example filtered anthracene oil, the raw material basis for the production of high grade binding and impregnating pitches is broadened considerably by the process according to the invention.

In the examples 1 to 5, the invention will be explained in more detail. In the table at the end of the description, the characteristic data of the electrode pitches obtained from a few reaction pitches produced according to the invention are compared to those of conventional electrode pitches.

All percentage data are to be understood as percent by weight.

EXAMPLE 1

50 parts by weight of pulverized bituminous coal standard pitch with a softening point (S.P.) of 75° C. (according to Kraemer-Sarnow) are mixed with 50 parts by weight of pulverized polystyrene wastes (S.P.=175° C.) and processed thermally for 5 hours at 370° C. and 30 bar under inert gas. With the distillation of the reaction mixture up to a sump temperature of 400° C., 29% of distillate of the following composition are obtained:

1% benzene
26% toluene
53% ethyl benzene
18% cumene
2% other hydrocarbons

The reaction pitch obtained at 69% with a softening point of 118° C. (K.S.) has 8.6% of quinolene-insolubles (QI) and 37.6% of toluene-insolubles (TI). Therefore, the β-resin portion (TI-QI) amounts to 29%. The coking residue according to Conradson amounts to 66%. Thus, the product possibly mixed with other pitches, is suitable as an electrode binder. Fluxed to a low softening point of about 80° C., it is moreover suitable as an impregnating agent for carbon molded articles.

EXAMPLE 2

50 parts by weight of comminuted polystyrene wastes are melted in 50 parts by weight of liquid bituminous coal-tar standard pitch (SP 75° C.) and are heated within 3 hours under inert gas in an agitator vessel from 330° to 420° C. At the same time, 41% of oils of the following composition are distilled off:

15% toluene
43% ethylbenzene
22% styrene
11% cumene
9% α-methylstyrene

The reaction product with a softening point of 200° C. (K.S.) is obtained at a yield of 58% and has 41% quinolene-insoluble (QI) and 63% toluene-insoluble (TI). The coking residue amounts to 70.4% (Conradson). The pitch is coked under an atmospheric pressure for more than 8 hours at 470° C. A highly anisotropic semi-coke with a volatility content of 5% is thereby obtained at 93% yield.

EXAMPLE 3

Corresponding to Example 2, a mixture of 20 parts of bituminous coal-tar standard pitch and 80 parts by weight of comminuted polystyrene wastes is thermally processed at about 300° C. for 8 hours. Subsequently, volatile components are distilled off by an increase in temperature up to 420° C., whereby 60% of aromatic oils are distilled.

As distillation residue at 31%, a reaction pitch of softening point 220° C. (K.S.) and a coking residue (according to Conradson) of 95% result. This pitch is coked according to Example 2 at 470° C. at a 97% yield into a highly anisotropic semicoke.

EXAMPLE 4

In 50 parts by weight of filtered anthracene oil (boiling range 300° to 420° C.)

50 parts by weight of powdered residue of foamed polystyrene (SP 131° C.) are melted and are heated under reflux in an agitator column under inert gas atmosphere within 8 hours to 300° to 350° C. The reaction mixture is distilled discontinuously up to a bottom temperature of 420° C. Thereby, there is obtained, beside 27.6% of reaction pitch, 38.2% of low boiling and 31.7% of high boiling oils. The low boiling oils have the following composition:

9% toluene
29% ethyl benzene
34% styrene
13% cumene
13% α-methyl styrene

The reaction pitch with a softening point of 141° C. hardly contains quinolene-insolubles (0.9%) but 44.6% of toluene-insolubles (TI) and thus about 44% of β-resin.

80 parts of reaction pitch are fluxed with 20 parts of the high boiling oils obtained to a softening point of 90° C. The pitch obtained thus with 1% quinolene-insolubles (QI), 39% toluene-insolubles (TI) and a coking residue (Conradson) of 51.7% is eminently well suited as an impregnating pitch for graphite electrodes.

EXAMPLE 5

According to Example 2, a mixture of 90 parts by weight of bituminous coal-tar standard pitch and 10 parts by weight of comminuted polystyrene wastes is thermally processed for 1 hour. During that time, 89.2% of reaction pitch with a softening point of 100° C. (K.S.) and 9.2% of benzene homologues develop. The pitch may be used directly as an electrode binder. The coking residue amounts to 54.4% (Conradson), the quinolene-insolubles (QI) is 8.6% and the toluene-insolubles (TI) 36.0%. The electrode pitch therefore contains 26.4% of β-resin.

EXAMPLE 6

In 50 parts by weight of liquid bituminous coal-tar standard pitch (S.P. 75° C.), 50 parts by weight of comminuted polyethylene wastes are melted and are thermally treated as in Example 2 for 1.5 hours at a temperature range of 410° to 450° C. During this time, 14.2% of gaseous cracked product (ethylene), 17.2% of oils boiling up to 450° C. of the homologue olefin series and 67% of reaction pitch with a softening point of 138° C. (K.S.) and a coking residue of 56% (B.M.=Brockmann-Muck) are obtained. The pitch is coked at 1050° C. in the by-product coke oven. The coke obtained at a 75% yield is suitable for the production of anode blocks in the aluminum industry.

TABLE

Comparison of the characteristic data of the electrode binding and impregnating pitches produced from the reaction pitches obtained according to the invention with the customary electrode binding or impregnating pitch characteristic data

| Reaction Pitch From Example | Fluxing Agent | Mixing Ratio | SP °C. | QI % | TI % | β-Resin (TI-QI) % | Coking Residue acc. to Conradson % |
|---|---|---|---|---|---|---|---|
| 1 | — | — | 118 | 8.6 | 37.6 | 29.0 | 66.0 |

TABLE-continued

Comparison of the characteristic data of the electrode binding and impregnating pitches produced from the reaction pitches obtained according to the invention with the customary electrode binding or impregnating pitch characteristic data

| Reaction Pitch From Example | Fluxing Agent | Mixing Ratio | SP °C. | QI % | TI % | β-Resin (TI-QI) % | Coking Residue acc. to Conradson % |
|---|---|---|---|---|---|---|---|
| 4 | heavy oil from experiment 3 | 80/20 | 90 | 1.0 | 39.0 | 38.0 | 51.7 |
| 5 | — | — | 100 | 8.6 | 36.0 | 26.4 | 54.4 |
| Electrode binder pitch | | | approx 100 | 10–15 | ≧30.0 | ≧20.0 | ≧57.0 |
| Electrode impregnating pitch | | | approx 80 | 2–4 | 20.0–25.0 | ≧20.0 | ≧50.0 |

We claim:

1. A process for the production of modified pitches and low boiling aromatics and olefins by thermal treatment of polyolefin plastic wastes in the presence of high boiling aromatics, consisting essentially of thermally treating 10–80 parts by weight of comminuted wastes of polyolefins at temperature above the decomposition point of said polyolefins and at a pressure between 1 and 30 bar with 20–90 parts by weight of an aromatic hydrocarbon mixtures boiling above 300° C. selected from the group consisting of filtered anthracene oil and bituminous coal tar pitch, under an atmosphere of an inert gas, whereby olefins, benzene homologues as well as a reaction pitch are obtained after distillative separation.

2. A process as in claim 1, wherein the polyolefin plastic wastes is polystyrene or foamed polystyrene.

3. A process as in claim 1, wherein the polyolefin plastic wastes are obtained by the polymerization of at least one ethylenically unsaturated monomer.

4. A process as in claim 1, wherein the thermal treatment between the comminuted polyolefin waste and the aromatic hydrocarbon mixture takes place at a temperature of from about 300° to about 450° C. for about 1 to 8 hours.

* * * * *